Patented Aug. 26, 1947

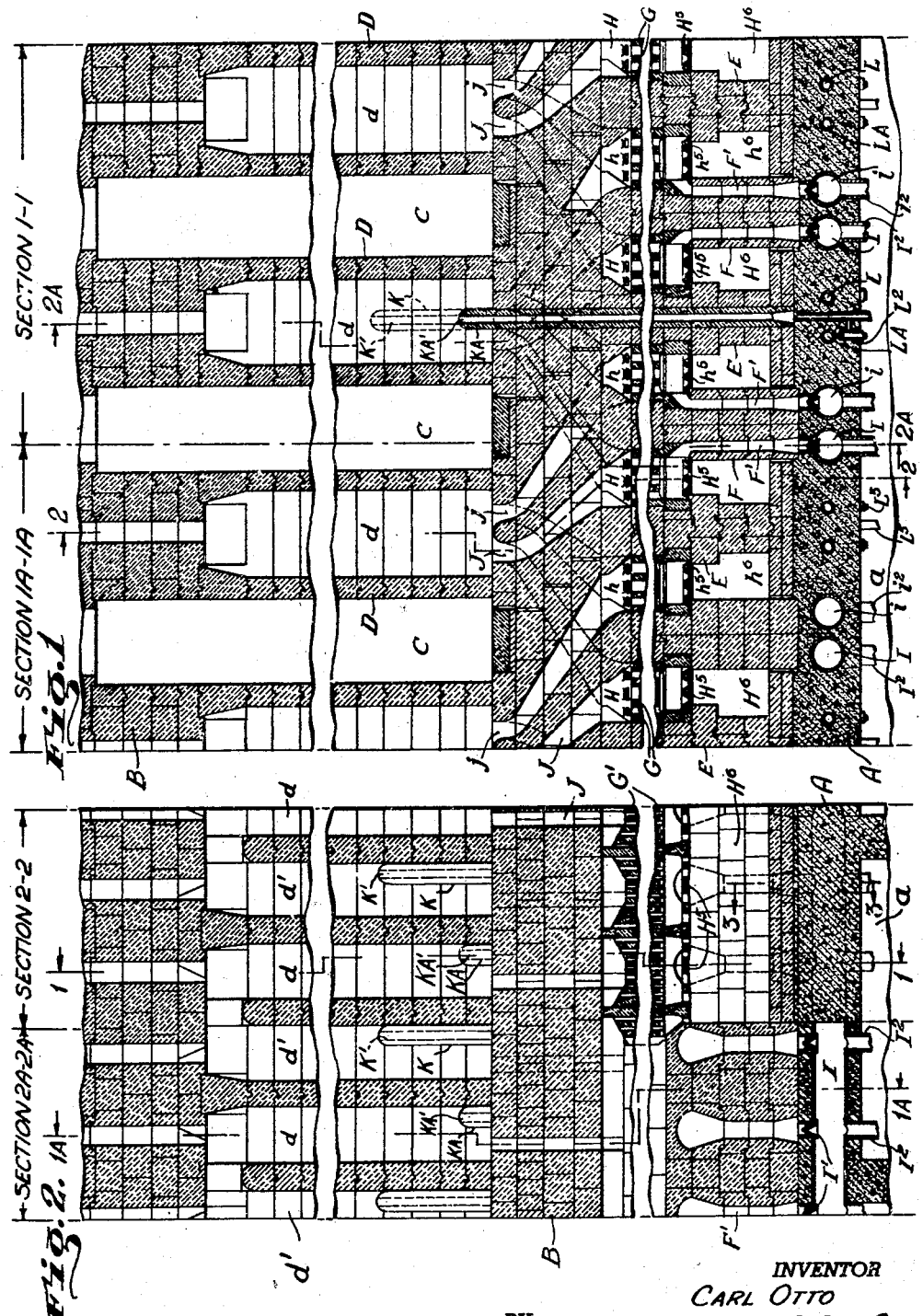

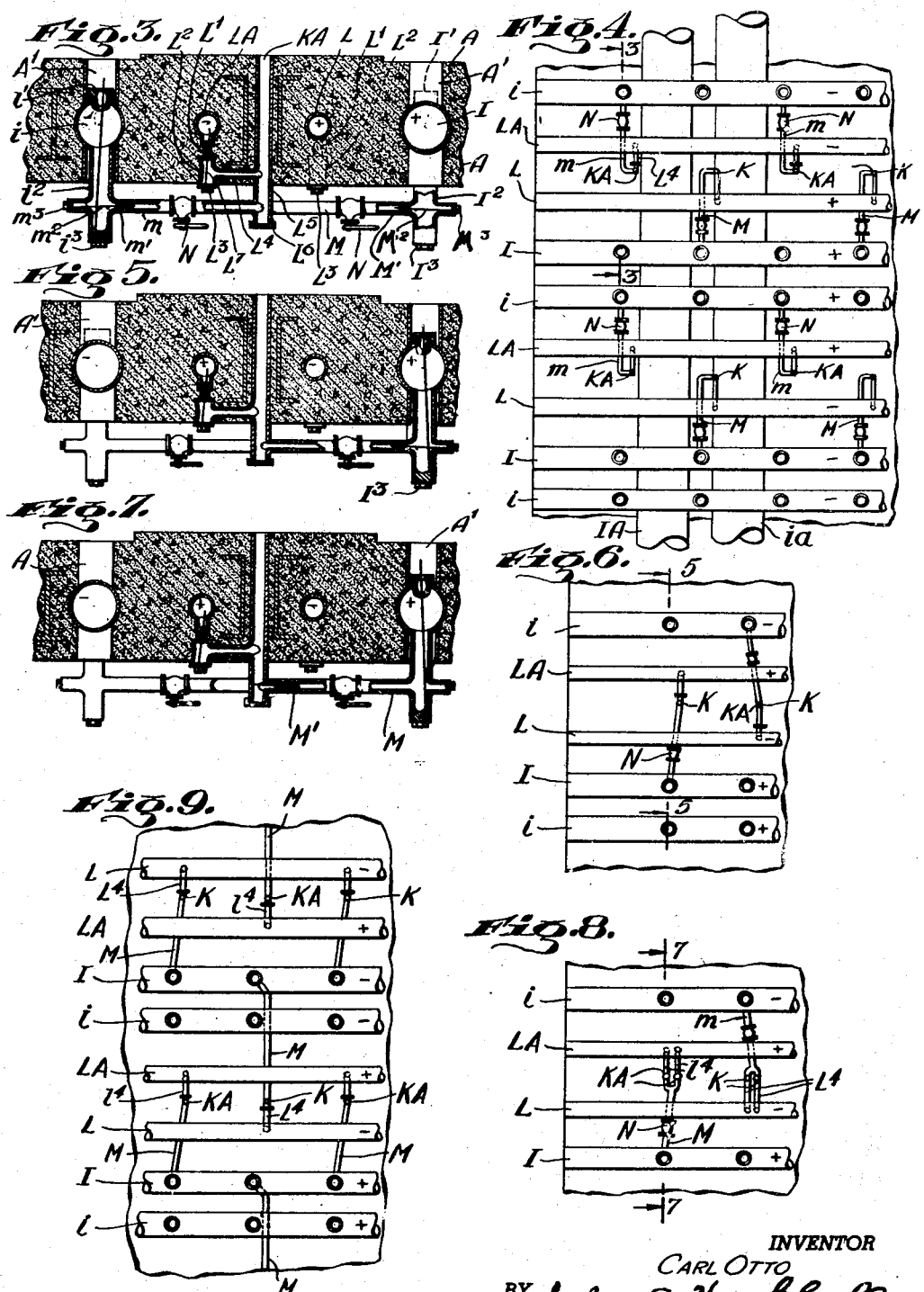

2,426,520

UNITED STATES PATENT OFFICE 2,426,520

APPARATUS FOR PASSING AIR ADMIXED WITH RICH FUEL GAS INTO HEATING FLUES OF UNDERFIRED REGENERATIVE COKE OVENS

Carl Otto, Manhasset, N. Y., assignor to Fuel Refining Corporation, New York, N. Y., a corporation of Delaware Application September 3, 1943, Serial No. 501,088

6 Claims. (Cl. 202—142)

1

The present invention relates to underfired coke ovens of the most usual type, comprising regenerators located below coking chambers and heating walls, and comprising means for supplying rich fuel gas, and combustion air preheated in the regenerators, to vertical heating flues in the heating walls. In coke ovens of the type mentioned, rich fuel gas is passed into the heating flues in the heating walls through uprising gas channels formed in the regenerator division walls and having adjustment devices accessible for adjustment from the basement space which underlies the coke oven brickwork.

The general object of the present invention is to provide coke ovens of the above mentioned type with improved means for mixing a small amount of air with the rich fuel gas passed into the heating flues through the rich gas supply channels in the operation of the ovens with rich fuel gas. The air thus admixed with the rich fuel gas prevents or minimizes objectionable carbon deposits in the hotter upper portions of the gas channels in the regenerator division walls and contributes to improved combustion conditions in the heating flues. The present invention is adapted for use in coke ovens heated at all times by the combustion of rich gas, and also in "combination" ovens heated at times by the combustion of regeneratively preheated lean fuel gas.

A more specific object of the present invention is to provide a regenerative coke oven including horizontal distribution pipes through which air to be preheated is passed into the regenerators, with simple conduit connections through which said distribution pipes supply air to the adjacent uprising rich fuel gas channels in the regenerator division walls.

The various features of novelty which characterize my invention are pointed out with particularity in the claims annexed to and forming a part of this specification. For a better understanding of the invention, however, its advantages and specific objects attained by its use, reference should be had to the accompanying drawing and descriptive matter in which I have illustrated and described preferred embodiments of the invention.

Of the drawings:

Fig. 1 is a partial longitudinal section of a coke oven battery partly broken away, mainly on the plane of the line 1A of Fig. 2 but with the section through one heating wall on the plane of the line 1—1 of Fig. 2, and intersecting one of the rich fuel gas supply channels leading to that heating wall.

2

Fig. 2 is a partial transverse section having its right hand portion taken on the line 2—2, and its left hand portion taken on the line 2A—2A of Fig. 1;

Fig. 3 is a section of a portion of the battery on a larger scale than Fig. 2 and taken on the line 3—3 of Fig. 2.

Fig. 4 is a diagrammatic plan view of the distribution piping at the bottom of the battery shown in Figs. 1–3;

Figs. 5 and 6 are views taken similarly to Figs. 3 and 4, respectively, illustrating a modification;

Figs. 7 and 8 are views taken similarly to Figs. 3 and 4, respectively, and illustrating a second modification; and Fig. 9 is a view taken similarly to Fig. 4 illustrating a third modification.

In Figs. 1–4 of the drawings, I have shown a horizontal underfired regenerative coke oven battery adapted to be heated either by the combustion of a lean gas such as blast furnace or producer gas, or of a rich gas such as coke oven gas. The battery shown comprises a concrete layer A which constitutes a supporting deck for the coke oven brickwork B and forms the roof of the conventional basement space $a$ of the battery. The deck A may be supported by any usual or suitable means not illustrated or described herein. The coke oven brickwork comprises an upper story or section and a lower story or section each of which may be, and as shown is, of known type. The upper story or section comprises horizontally elongated coking chambers C alternating with heating walls D, each of the chambers and walls extending from one side of the battery to the other. Each heating wall is formed with vertical flues $d$ and $d'$ alternating with one another in a row extending from one side of the battery to the other. Each flue $d$ and an adjacent flue $d'$ are connected at their upper ends and thus form the two limbs of a twin or hairpin flue.

In the lower story or section of the battery, regenerator division walls E and F extending between the opposite sides of the battery, alternate along the length of the latter. As shown, there is a wall E beneath each heating wall D and a wall F beneath each coking chamber C. The walls E and F are conveniently designated "pillar" and "intermediate" walls, respectively, although they may be similar in thickness and each contributes to the support of the battery upper story or section. Between each pillar wall E and each adjacent intermediate wall F is an air preheating regenerator H or a similar regenerator $h$ conveniently referred to as a gas regenerator, although it is adapted for use either in preheating combustion air or lean fuel gas accordingly as the battery is heated by the combustion of rich fuel gas not regeneratively preheated, or by the combustion of lean fuel gas preheated in the regenerators $h$. The regenerators H and $h$ include regenerator checker bricks G. Advantageously, though not necessarily, the checker bricks in each of the regenerators H and $h$ are shaped and disposed to divide the regenerative space into a row of vertical regenerator cells in the manner disclosed in my prior Patent No. 21,933, reissued October 28, 1941. Each regenerator H and $h$ is connected by individual brickwork channels J and $j$, respectively, to one limb of each twin flue in each of the two adjacent heating walls, and each of the flue limbs $d$, $d'$ is connected to one regenerator H and to one regenerator $h$. As will be understood, the two regenerators which are connected to any one flue limb $d$ serve as "on" and "off" regenerators at times at which the two regenerators connected to the limb $d'$ of the same twin flue serve as "off" and "on" regenerators, respectively.

Each of the regenerators H and $h$ receives the combustible agent, air or lean fuel gas, which it preheats, through a corresponding horizontal distribution pipe I or $i$, respectively. Each of said pipes is shown as embedded in the concrete layer A and formed with a multiplicity of upper outlets distributed along its length. The flow through each of said outlets of the pipes I is regulated by the size of the measuring orifice or nozzle passage in a nozzle member I' threaded into or otherwise removably mounted in the outlet openings. To provide access for cleaning or replacing each member I', the pipe I with which it is associated, is formed with a depending tubular branch I² in register with the outlet in which said member is mounted. The lower end of each pipe I² is normally closed by a plug I³ which is accessible for removal and replacement from the basement space $a$. Similarly, each pipe $i$ supplies air or gas to the corresponding regenerator $h$ through upper outlets including orifice members $i'$, and the latter may be cleaned or replaced through depending branch pipes $i^2$ normally closed at their lower ends by removable plugs $i^3$. As shown, the pipes I and $i$ for the two regenerators H and $h$ at opposite sides of and immediately adjacent each intermediate wall F, are located beneath the latter.

Each of the members I' and $i'$ discharges into the upper portion of the corresponding passage A' and the latter communicates at its upper end with the lower end of a corresponding uprising channel F' in the brickwork. Each channel F' has its upper end enlarged and opening laterally at its upper end into the corresponding regenerator H or $h$ above the grid-like refractory parts H⁵ of $h^5$ between the regenerator checker bricks and the subjacent horizontal regenerator sole channel H⁶ or $h^6$. Each of said regenerator sole channel H⁶ and $h^6$ may extend from one side to the other of the battery, and is connected at one end, or at each end, through a corresponding reversing valve to a corresponding waste heat tunnel. The reversing valve and waste heat tunnel arrangement may be the usual type and therefore need not be illustrated or further described herein.

In operation with rich fuel gas, the flues $d$ and $d'$ in each heating wall receive fuel gas through corresponding individual vertically extending channels KA and K, respectively, formed in the subjacent pillar wall E, and each opening at its upper end to the corresponding flue $d$ or $d'$ through a burner KA' or K' respectively. In the particular arrangement shown by way of example in the drawings, the burners KA' have their outlets in the flues $d$ adjacent the lower ends of the latter, and the burners K' are located in the flues $d'$ and have their outlets at a level a foot or two above the level of the outlets of the burners KA'. For the general purpose of the present invention, however, the relative levels of the outlets of the burners K' and KA' are not essential.

In the particular battery arrangement shown in the drawings, the flues $d$ and flues $d'$ serve alternately as combustion or upflow flues and the flues $d$ and $d'$ in each heating wall are displaced longitudinally of the heating walls, with respect to the flues $d$ and $d'$ in each immediately adjacent heating wall, so that at each side of the battery, the end flue in every second heating wall is a flue $d$, and in each other heating wall is a flue $d'$. The displacement of the flues $d$ and $d'$ in adjacent heating walls just mentioned is not an essential feature of the present invention, but permits a convenient arrangement of the regenerator and flue connecting channels J and $j$.

All of the channels KA which open at their upper ends to the flues $d$ in any one heating wall, are supplied with rich fuel gas through a corresponding horizontal distribution pipe LA embedded in the deck member A and provided with an individual tubular depending outlet for each of the flues $d$ which it serves. Similarly, the channels K in each heating wall which open at their upper ends into the flues $d'$ are supplied with rich fuel gas by means of a horizontal distribution pipe L which may be identical with the pipe LA in form and in the character of the connections thereto. Each two associated pipes L and LA are located at opposite sides of the corresponding row of alternating channels K and KA. Each of said depending outlets of the pipes L and LA is connected by an orifice member L' into a T connector part L². The lower end of the latter extends below the bottom surface of the deck A and is internally threaded to receive a removable plug L³. The transverse opening in the T part L² receives the corresponding end of a short horizontal pipe section L⁴ having its other end connected to a vertical metal pipe L⁵. The latter extends through the deck A and has its upper end in register with the brick work portion of the corresponding channel K or KA. The lower end of the pipe L⁵ is closed by a cap L⁶ which may be removed to permit of inspection and cleaning of the associated channel K. Each orifice nozzle member L' is advantageously replaceable or subject to a throttling adjustment in a known manner to regulate the volume of gas flow from the distribution pipe L through it to the corresponding flue $d$ or $d'$.

In operation with lean fuel gas, air under pressure slightly above the pressure of the atmosphere is supplied from a main IA to the various distribution pipes I and air regenerators H, and lean gas is supplied to the pipes $i$ and regenerators $h$ from a main $ia$. In operation with rich fuel gas, the regenerators $h$ also receive air from the main IA. To control the flow of air and lean gas to the pipes I and $i$ from the mains IA and $ia$, suitable connections including reversing valves are required, but such connections and reversing valves need not be illustrated or further referred to herein because their form constitutes no part of the present invention and they may be of well known type, such, for example, as that disclosed in the Wethly Patent 2,302,728 of November 24, 1942.

In so far as above described, the coke oven structure illustrated includes nothing claimed as novel herein, but is an example of a desirable form and type of coke oven in which the present invention may be used to advantage. In operation with rich fuel gas, as those skilled in the art will understand, during each reversal period in which the vertical channels KA are supplying rich fuel gas to them, the flues $d$ in each heating wall receive preheated combustion air supplied in part by the immediately adjacent regenerator H and distribution pipe I, and during the alternate reversal periods in which the flues $d'$ in the same heating wall are receiving rich fuel gas through the corresponding channels K, those flues $d'$ are also receiving preheated combustion air supplied in part by the immediately adjacent regenerator $h$ and distribution pipe $i$.

In the form of the present invention illustrated in Figs. 1–4 during periods in which the vertical channels KA associated with any one heating wall are passing rich fuel gas to the flues $d$ in that wall, they are also receiving air from the immediately adjacent distribution pipe I through individual pipes M, each of which connects the lower end of the corresponding pipe $L^5$ to the lower end of the adjacent tubular depending branch $I^2$ from said pipe I. Similarly, each of the pipes $L^5$ associated with the vertical gas channels K leading to the flues $d'$ in any single heating wall has its lower ends connected by an individual pipe $m$ to the depending branch $i^2$ from the immediately adjacent distribution pipe $i$.

In Figs. 3–9 plus signs (+) are applied to certain of the pipes to indicate that those pipes are passing a combustible agent of air or rich fuel gas to the associated combustion flues, at a time at which other pipes to which minus signs (−) are applied, are idle. Figs. 3 and 4 thus indicate that during a reversal period in which the distribution pipes $i$ and LA are not passing air and rich fuel gas to the associated regenerators $h$ and supply passages K, each distribution pipe L is supplying rich fuel gas to the associated channels K, and each distribution pipe I is supplying air through the associated orifices I' to the associated regenerator H and through its branch pipes M is supplying to each of the associated channels K, air for admixture with the rich fuel gas being supplied to that channel from the adjacent distribution pipe L. When the flow through the battery is reversed at the end of the reversal period, the pipes I and L cease to pass air and rich fuel gas to the associated regenerators H and channels K, respectively, and each pipe LA then supplies rich fuel gas to the associated channels KA, and each distribution pipe $i$ then supplies air through the associated orifice members $i'$ to the associated regenerator $h$ and supplies air through the associated pipes M to the lower ends of the corresponding vertical gas supply channels KA.

The amount of air supplied by each pipe $i$ to each associated vertical gas supply channel K should be suitably proportioned to the amount of rich fuel gas supplied to that channel. With the construction shown, the amount of air thus supplied to each channel K is regulated by a measured orifice member M' in the corresponding pipe M. To vary the amount of air passing through each pipe M, each member M' may be made replaceable by another orifice member of different flow capacity. Ordinarily, however, the use of interchangeable orifices M' is unnecessary, and such adjustment, if any, of each orifice member M' as may be desired may be effected by the use of a throttling rod $M^2$ of one or another size extending through the orifice member and replaceable through an opening in the lower end of the corresponding pipe $I^2$, normally closed by a removable plug $M^3$. Each pipe $m$ has associated elements $m'$, $m^2$ and $m^3$, similar to the above mentioned elements M', $M^2$ and $M^3$, respectively.

The arrangement shown in Figs. 1–4 thus provides in a very simple and effective manner for the admixture with the rich fuel gas supplied through each of the various channels K and K$a$, of the proper amount of air to maintain that channel free from objectionable carbon or graphite deposits and to improve rather than to diminish the efficiency of combustion in the heating flue to which the upper end of the channel is connected. In ordinary operation, substantially the same air and gas ratio in the channels K and KA will be maintained with varying coking times, since it is customary in the operation of such a battery to simultaneously and proportionally increase or decrease the pressures in the gas distribution pipes L and LA and air distribution pipes I and $i$, to decrease or increase the coking time. The use of the invention requires no increase in the number of the reversing valves employed or other change in the battery reversing mechanism.

The use of the invention avoids an objectionable risk of leakage of rich fuel gas into the battery basement space which exists with a prior arrangement in which the air for admixture with the rich gas is sucked into the branch pipe connections between the rich fuel gas distribution pipes and the uprising gas channels in the regenerator division walls through permanently open bleeder ports in said pipe connections. The out leakage of gas into the battery subway space through said bleeder ports which may occur under certain conditions creates an explosion risk and objectionally pollutes the subway space atmosphere in which battery attendants must work.

In operation with lean fuel gas which is supplied to the combustion flues in a preheated condition by the regenerators $h$, it is ordinarily undesirable to pass any of the lean fuel gas into the flues $d$ and $d'$ through the associated channels K and KA from the distribution pipes $i$ shown in Figs. 3 and 4 and the passage of air into the flues from the distribution pipes I is not helpful in ordinary lean gas operation. To prevent upflow of air or gas through the channels K and KA in lean gas operation, the arrangement shown in Figs. 3 and 4 includes a cut-off valve N in each of the pipes M and $m$. The valves N may be manually adjusted, and ordinarily are all kept closed throughout each period in which the battery is operated with lean fuel gas, such as blast furnace gas, and are all kept open throughout each period in which the battery is heated by the combustion of rich fuel gas.

As shown in Figs. 3 and 4, the air distribution pipe I or $i$ and the gas distribution pipe L or LA supplying combustion air and rich fuel gas, respectively, to any one of the channels K and KA, are both located at the same side of the vertical plane extending transversely of the battery and including the axis of said channel. In the modified arrangement shown in Figs. 5 and 6, the two distribution channels I and LA or $i$ and L simultaneously supplying combustion air and rich fuel gas to any one channel K or KA, are located on opposite sides of the vertical plane transverse to the battery and including the axis of said channel. As Figs. 3-6 collectively makes apparent, the branch pipe connections beneath the deck member A in Figs. 5 and 6 are somewhat simpler than those in Figs. 3 and 4, in consequence of the fact that in the arrangement shown in Figs. 3 and 4, the pipes M and m must be displaced crosswise of the battery from the corresponding channels K and KA, to provide suitable access to the rich fuel gas pipe openings including the removable plugs L³ and l³. This necessitates the use of elbows in the pipes M and m shown in Fig. 4 which are not required in the pipes shown in Fig. 6.

Figs. 7 and 8 illustrate an arrangement for use when each of the flues d and d' includes two burners at different levels as is shown, for example, in my prior Patent 2,224,920, granted December 17, 1940. As shown in Figs. 7 and 8, the two channels K or KA leading to each flue d or d' receive rich gas from the same distribution pipe L or LA through separate regulable connections to the two corresponding pipe branches L⁴ or l⁴, but receives air from the corresponding pipe I or i through a single pipe M or m.

In Fig. 9 I have illustrated an arrangement in which air is supplied to the uprising gas channels KA, as well as to the channels K, by the distribution pipes I employed to supply air to the air regenerators H. As shown in Fig. 9, the channels K in any one regenerator division wall receive air from a distribution pipe I at one side of the wall and the channels KA in the same wall receive air from a distribution pipe I at the opposite side of said wall.

With this arrangement no means such as the cut-off valve stream are needed to prevent the upflow of lean fuel gas into the combustion flues through any of the gas channels K and KA in operation with lean gas firing. The arrangement shown in Fig. 9 does not prevent the upflow of air into the flues through the channels K and KA when the heating flues to which they are connected are serving as upflow or combustion flues but as already indicated passage of jets of air into the combustion flues through the channels K and KA during lean gas operation is not seriously objectionable.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An underfired coke oven battery comprising a masonry structure above a basement space and formed with coking chambers, heating walls alongside the coking chambers and having vertical heating flues, and regenerators and regenerator division walls beneath and parallel to said chambers and heating walls, means for passing air into said regenerators for preheating therein comprising distribution pipes extending longitudinally of said regenerators and each connected to a corresponding regenerator at distributed points along its length, and means for passing rich fuel gas admixed with air into said flues, the last mentioned means comprising uprising gas supply channels formed in said division walls and each connected at its upper end to a corresponding flue, means for passing rich fuel gas into the lower end of each of said channels and a conduit connection for passing air into the lower end of each of said channels from an adjacent air distribution pipe.

2. An underfired coke oven battery as specified in claim 1, in which said distribution pipes are embedded in said structure and in which each of said pipes has associated therewith pipe branches extending to said basement space and regulating devices accessible for adjusting through said pipe branches to thereby regulate the passage of air from the pipe to the corresponding regenerator, and in which each of the conduit connections for passing air into the lower ends of the uprising gas supply channels includes a corresponding one of said pipe branches.

3. An underfired coke oven battery as specified in claim 1, optionally operable with rich fuel gas firing and with lean fuel gas firing, and having each of said vertical flues connected at its lower end to two adjacent regenerators one of which is used in preheating combustion air in operation with either fuel gas firing, and comprising means for using the other of said two regenerators in preheating combustion air in rich gas firing and in preheating fuel gas in lean gas firing, and comprising means for preventing the upflow of gas through said uprising gas supply channels in operation of the battery with lean gas firing.

4. An underfired coke oven battery as specified in claim 1, optionally operable with rich fuel gas firing and with lean fuel gas firing, and having each of said vertical flues connected at its lower end to two adjacent regenerators one of which is used in preheating combustion air in operation with either fuel gas firing, and comprising means for using the other of said two regenerators in preheating combustion air in rich gas firing and in preheating fuel gas in lean gas firing and cut-off valves in the said conduit connections to the lower ends of the uprising gas supply channels from the said distribution pipes.

5. An underfired coke oven battery as specified in claim 1, optionally operable with rich fuel gas firing and with lean fuel gas firing, and having each of said vertical flues connected at its lower end to two adjacent regenerators one of which is used in preheating combustion air in operation with either fuel gas firing, and comprising means for using the other of said two regenerators in preheating combustion air in rich gas firing and in preheating fuel gas in lean gas firing and in which the distribution pipe connected, and passing air to the lower end of each of said uprising gas supply channels is a distribution pipe supplying air to an adjacent regenerator used in preheating combustion air in operation with either lean fuel gas or rich fuel gas firing.

6. An underfired coke oven battery comprising a masonry structure above a basement space and formed with coking chambers, heating walls alongside the coking chambers and having vertical heating flues, and regenerators and regenerator division walls beneath and parallel to said chambers and heating walls, means for passing air into said regenerators for preheating therein comprising distribution pipes embedded in the lower portion of said structure and extending longitudinally of said regenerators and each connected to a corresponding regenerator at distributed points along its length, and means for passing rich fuel gas admixed with air into said flues, comprising uprising channels formed in said division walls and connected at their upper ends to said flues, rich fuel gas distribution pipes parallel to said division walls and embedded in the lower portion of said masonry structure, a separate branch pipe connection to the lower end of each channel from an adjacent rich gas distribution pipe, and conduit means extending through said basement space for passing air into the lower end of each of said channels from an adjacent air distribution pipe.

CARL OTTO.

REFERENCES CITED

The following references are of record in the file of this patent:

UNITED STATES PATENTS

| Number | Name | Date |
|---|---|---|
| 2,228,130 | Van Ackeren | Jan. 7, 1941 |
| 2,302,728 | Wethly | Nov. 24, 1942 |
| 1,754,603 | Brown | Apr. 15, 1930 |
| 985,394 | Case | Feb. 28, 1911 |